United States Patent [19]
Disselbeck

[11] Patent Number: 5,607,743
[45] Date of Patent: Mar. 4, 1997

[54] METALLIZED THREE-DIMENSIONALLY DEFORMED, DIMENSIONALLY STABLE GAUZE COMPRISING TEXTILE MATERIAL

[75] Inventor: Dieter Disselbeck, Bad Soden am Taunus, Germany

[73] Assignee: Hoechst Aktiengesellschaft, Germany

[21] Appl. No.: 189,427

[22] Filed: Jan. 31, 1994

Related U.S. Application Data

[63] Continuation of Ser. No. 526,174, May 21, 1990, abandoned.

[30] Foreign Application Priority Data

May 23, 1989 [DE] Germany .......................... 39 16 713.5

[51] Int. Cl.⁶ ........................................... B32B 3/24
[52] U.S. Cl. .......................... 428/131; 428/119; 428/120; 428/178; 428/166; 428/136; 428/332; 428/334; 428/215; 428/458; 428/418; 428/460; 442/10; 442/13
[58] Field of Search ........................ 428/119, 120, 428/178, 166, 131, 136, 256, 263, 285, 252, 265, 290, 332, 334, 215, 458, 418, 460

[56] References Cited

U.S. PATENT DOCUMENTS

| | | | |
|---|---|---|---|
| 1,790,615 | 6/1931 | Neuber et al. | 428/263 |
| 2,865,787 | 12/1958 | Risch | 428/263 |
| 2,912,345 | 11/1959 | Weiss | 428/179 |
| 4,123,488 | 10/1978 | Lawson | 264/135 |
| 4,287,097 | 9/1981 | Fratzer et al. | 428/256 |
| 4,435,465 | 3/1984 | Ebneth et al. | 428/263 |
| 4,467,005 | 8/1984 | Push et al. | 428/263 |
| 4,484,400 | 11/1984 | Lehrman | 428/263 |
| 4,508,776 | 4/1985 | Smith | 428/263 |
| 4,560,608 | 12/1985 | Pusch et al. | 428/263 |
| 4,631,221 | 12/1986 | Nisselbeck et al. | 428/178 |
| 4,678,699 | 7/1987 | Kritchevsky et al. | 428/175 |
| 4,687,719 | 8/1987 | Von Benda et al. | 429/234 |
| 4,749,625 | 6/1988 | Obayashi et al. | 428/256 |
| 5,114,812 | 5/1992 | Disselbeck et al. | 429/234 |

FOREIGN PATENT DOCUMENTS

| | | |
|---|---|---|
| 2325503 | 4/1977 | France . |
| 3729633 | 3/1989 | Germany . |

OTHER PUBLICATIONS

Praktische Glavanotechnik, coversheet and p. 354 undated.

*Primary Examiner*—William Watkins
*Attorney, Agent, or Firm*—Connolly & Hutz

[57] ABSTRACT

The invention relates to a dimensionally stable gauze three-dimensionally deformed by deep drawing, which is based on a flat-shaped resin-coated textile material capable of being deep drawn, the open meshes of which are formed from the meshes, extended by deep drawing, of a woven fabric or of a knitted fabric, and which has a metallized surface. The surface metal coating has a thickness of up to 300 μm and consists of one or more layers. Various applications and a process for the manufacture of this gauze are also described.

13 Claims, 2 Drawing Sheets

Fig. 1
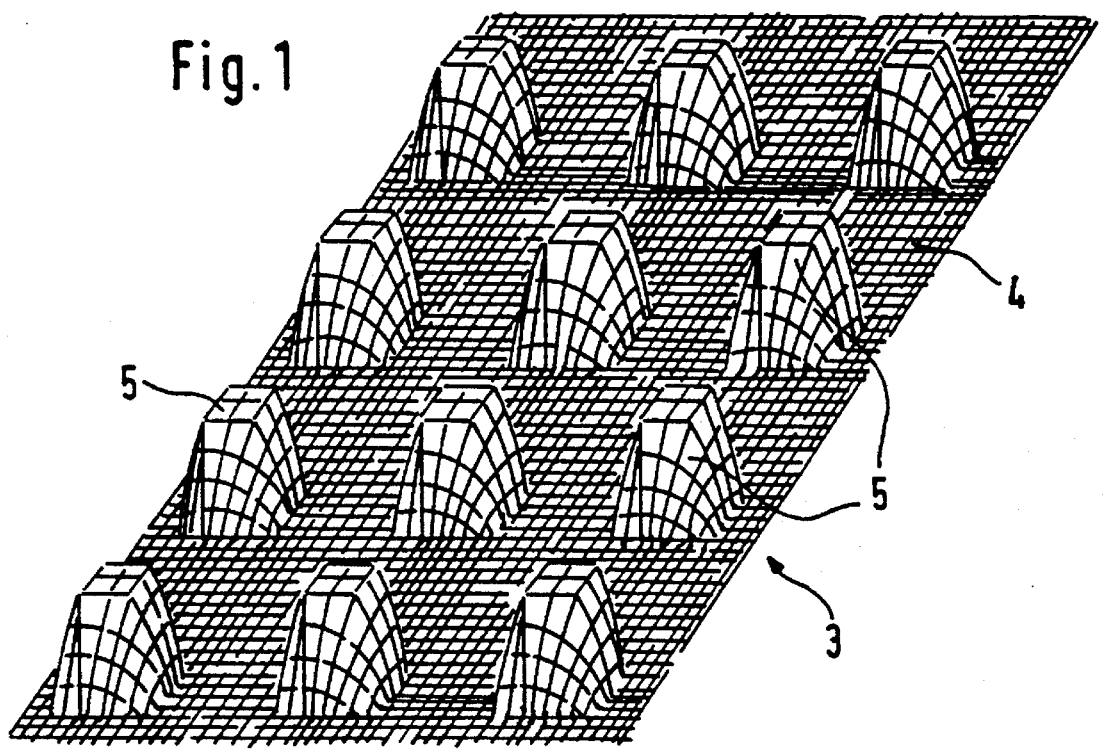
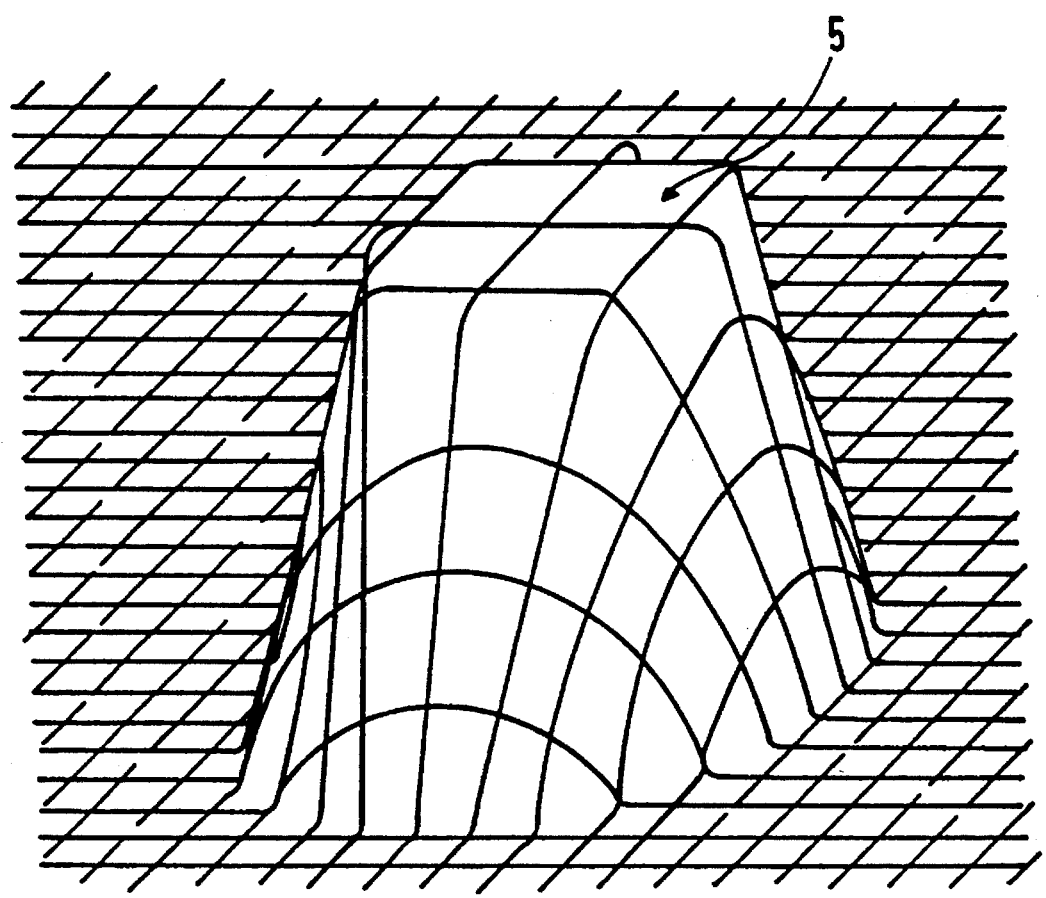
Fig. 2

METALLIZED THREE-DIMENSIONALLY DEFORMED, DIMENSIONALLY STABLE GAUZE COMPRISING TEXTILE MATERIAL

This application is a continuation of my application Ser. No. 07/526,174, filed May 21, 1990, now abandoned.

The present invention relates to a three-dimensionally deformed, dimensionally stable, electrically conductive gauze based on a flat-shaped resin-coated textile material capable of being deep drawn, to a process for its manufacture and to its use as a packing material for columns, a catalyst and a catalyst support and for the manufacture of electrically conductive sandwich structures and dimensionally stable, lightweight electrical screens.

Flat-shaped sandwich materials made up of a core and two facings, the core consisting of dimensionally stable, three-dimensionally deformed textile fabrics based on fiber materials, are already known, e.g. from FR-A-23 25 503 and EP-A-158 234. The sandwich material described in these publications has a core consisting of a three-dimensionally deformed, flat-shaped textile material possessing, uniformly arranged on a base, a large number of elevations of equal height and with a flat plateau. As regards their structure, there are appreciable differences between the core materials known from FR-A-23 25 503 and EP-A-158 234. Whereas the materials known from FR-A-23 25 503 have an essentially completely closed structure in which both the bases and the walls of the elevations distributed over the base form a massive, pore-free fiber-permeated mass of resin, the core materials known from EP-A-158 234 have a network structure consisting of resin-impregnated filaments with open meshes.

This fundamental difference between the materials known from said publications derives from the fact that they are manufactured by fundamentally different methods.

The core material known from FR-A-23 25 503, with a closed structure, is manufactured by compressing a resin-impregnated staple fiber mass in a mold of the desired geometrical shape. A relatively large amount of resin, based on the fiber weight, is used in this process so that an essentially fiber-reinforced resin molding is obtained after compression. The resulting core material has a relatively high weight. It does not permit gas exchange and it has a low flexibility.

By contrast, the core material known from EP-A-158 234, with a network structure, is manufactured by deep drawing a textile material, capable of being deep drawn, which is impregnated with a relatively small amount of resin, e.g. a resin-impregnated knitted fabric, i.e. a textile layer of filaments or yarns which are fixed and secured to one another in a uniform arrangement. This core material known from EP-A-158 234 has a very low density and a good mechanical stability. It permits free gas exchange between the sides of the surface and has a high flexibility.

Naturally, neither the core material known from EP-A-158 234 nor that described in FR-A-23 25 503 has a significant electrical conductivity.

It has now been found, surprisingly, that it is also possible to manufacture electrically conductive, three-dimensionally deformed and dimensionally stable gauzes based on resin-impregnated textile materials which—like the core materials known from EP-A-158 234—have a filigree-type network structure with open meshes.

It is already known to provide moldings made of a number of organic materials with a metallic coating. A survey of the necessary procedures can be found e.g. in the monograph "Praktische Galvanotechnik" ("Practical Electroplating"), Eugen G. Leuze Verlag.

Hitherto, preferably copolymers of acrylonitrile, butadiene and styrene (ABS plastics) have been electroplated because, by surface dissolution (etching) of butadiene out of the polymer backbone, caverns are formed in which the metal coating can anchor itself (press-stud effect). Using modified surface activation, polypropylene, nylon and—with the inclusion of complicated pretreatment steps—epoxy or thermosetting resins, for example, have also been metallized on the surface. As can be seen from the monograph "Praktische Galvanotechnik" ("Practical Electroplating") cited above (cf. p. 354, section 9.4, lines 1–3), it is to be regarded as particularly important, with a view to subsequent metallization, to ensure that the molded plastic articles have a "construction suitable for electroplating". In particular, problems frequently arise if there are internal stresses in the plastic moldings.

It was therefore most surprising to find that it is possible to provide a composite consisting of a resin-coated textile material with a strongly adhering metal coating in order to obtain an electrically conductive surface, said composite being in the form of a three-dimensionally deformed network structure which on the one hand arises from the mesh opening of the textile starting material which necessarily takes place during manufacture, and on the other hand is optimized in respect of its combination of application-related properties, e.g. light weight, permeability and high mechanical stability, but which does not comply with the principles of a "construction suitable for electroplating", the textile fibers present normally still containing certain internal stresses originating from the manufacture of the fiber material and the deep-drawing process.

The present invention thus relates to a three-dimensionally deformed, dimensionally stable gauze based on a flat-shaped resin-coated textile material capable of being deep drawn, said gauze having an electrically conductive surface.

BRIEF DESCRIPTION OF THE DRAWINGS

FIG. 1 is an isometric view of an embodiment of a three-dimensionally deformed gauze of this invention.

FIG. 2 is an isometric view, greatly enlarged, of a portion of the embodiment of FIG. 1.

DETAILED DESCRIPTION

Figure 3:
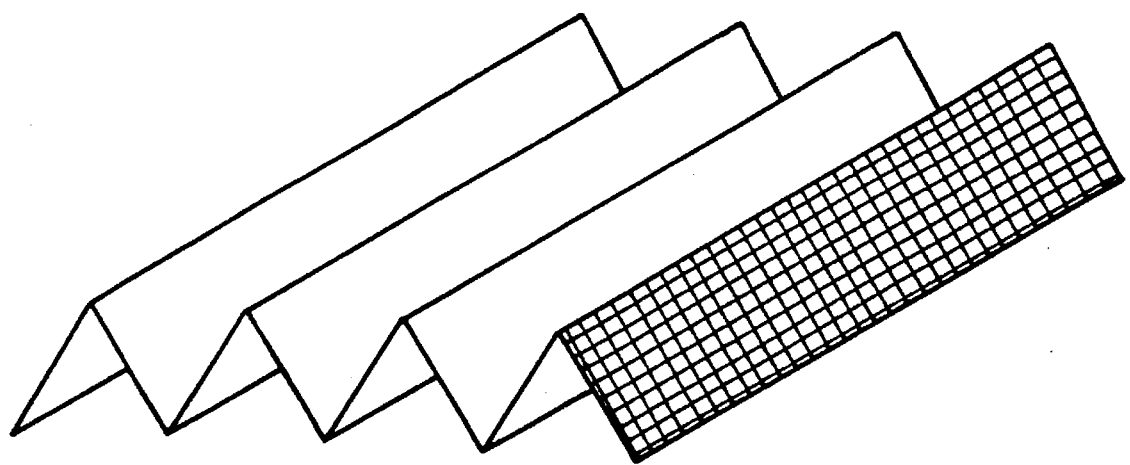
FIG. 3 is an isometric view of another embodiment of this invention.

The electrically conductive surface of the gauze according to the invention consists of a thin metal coating adhering strongly to the resin-coated textile material. The thickness of the surface metal coating is up to 300 μm and preferably 20 to 100 μm. For the durability of the electrically conductive surface metal coating, it is convenient to choose metals which do not corrode under normal conditions, i.e. metals which, at normal ambient temperatures in dry or moist air, either remain totally unaffected or undergo no further change after the formation of a surface coating of oxide or carbonate. The first type of conductive metal coatings includes those made of noble metals such as gold or platinum metals. The second type of coating includes metal coatings made of less noble metals such as silver, copper, lead, tin, aluminum and the like.

The electrically conductive metal coating of the gauze according to the invention can also be a multilayer coating; thus, for example, a first layer of copper can be followed by a very thin layer of a noble metal, or a relatively thin layer of copper or nickel can be followed by a thicker layer of other metals. If the facing consists of a metal other than copper, nickel or gold, it is especially preferred to have a multilayer metal coating of which the layer lying immediately on top of the organic material of the gauze consists of copper, nickel or gold, preferably copper or nickel and most preferably copper.

The electrically conductive metal coating of the gauze according to the invention can also consist of a mixture of different metals, preferably metals which form alloys with one another, e.g. a mixture of lead and tin.

In particular, the metallic coating of the gauzes according to the invention is formed of metals which have a normal potential of −1.3 to +1.6 V, preferably −0.8 to +1.6 V, relative to hydrogen, in the electrochemical series.

Tin, lead, a lead/tin mixture, copper, nickel, silver, gold or platinum metals are especially preferred for the metallic coating of the gauzes according to the invention, it being possible in particular to use gold or platinum metals as the facing as well, on a base layer consisting of one of the aforementioned metals, especially copper or nickel. Preferably, there is a relatively thin layer of nickel or gold and especially copper immediately on top of the polymer material of the gauze, said layer then being followed by further, thicker layers of the other metals mentioned above.

The open meshes of the filigree-type network structure of the electrically conductive gauze according to the invention are a characteristic geometrical feature of this material. They are formed from the meshes, extended by deep drawing, of a flat-shaped textile material, e.g. of a cross-laid fabric fixed by means of extensible filling threads, of a split-knitted fabric, of a woven fabric or, in particular, of a knitted fabric. If the base material used for the gauze according to the invention is a cross-laid fabric in which the bundles of filaments intersect at angles of about 5° to 30°, or a woven fabric, it is necessary for the flat-shaped textile material to consist of fibers or at least to contain an effective proportion of fibers which themselves have a relatively high, reversible or non-reversible extensibility, in order to give the material an adequate deep-drawing capability. The deep-drawing capability of a knitted fabric, on the other hand, is substantially independent of the extensibility of the fiber material. It is therefore preferred to use a knitted fabric as the base for the manufacture of the electrically conductive gauzes according to the invention. In principle, the fiber material of the flat-shaped textile materials is of secondary importance. However, it will be chosen so as to be likely to fulfil the intended purpose in optimal manner. Whereas the physical properties of natural fibers can only be influenced to a limited extent, the physical properties of synthetic fibers can be optimally adapted to the desired purpose. It is therefore especially preferred to use synthetic fiber materials, e.g. polyamides, polyacrylonitrile, polyolefin fibers or, in particular, polyester materials, as starting materials for the manufacture of the electrically conductive gauzes according to the invention, although, among these, types which have a particularly high mechanical strength are especially preferred. An example of such fiber materials is the commercial product ®TREVIRA hochfest. For special purposes, it is also possible to use synthetic fiber materials of low combustibility, e.g. ®TREVIRA CS, or end group capped polyester materials which are particularly resistant to chemical influences. The three-dimensionally deformed, electrically conductive gauzes according to the invention are dimensionally stabilized by impregnation of the textile material with resin.

The dimensionally stabilizing resins contained in the gauzes according to the invention can be taken from the various known groups of thermoplastic or thermosetting resins, provided their mechanical properties permit dimensional stabilization of the gauzes according to the invention. Examples of suitable thermoplastic resins are polyacrylates or polyvinyl chloride, but thermosetting resins, e.g. melamine and, in particular, phenolic resins, are preferred.

The amount of resin contained in the three-dimensionally deformed gauzes according to the invention, relative to the weight of the textile material, is determined so that the meshes open to form a filigree network when the flat-shaped textile material is deep drawn. The amounts deposited are appropriately in the range from 50 to 500 g, preferably 100 to 300 g, of resin/$m^2$ of the unstretched textile material. Within these indicated ranges, the amount of resin is also conveniently adapted to the square meter weight of the textile material capable of being deep drawn. Thus, the upper half of the ranges indicated will be used for a heavy textile material and the lower half for light textile materials. As stated above, the decisive criterion is the condition that, in the deep-drawing process, the meshes of the textile material open to form a network.

The three-dimensionally deformed gauze according to the invention has a large number of deformations extending at least in a direction which has a component perpendicular to the original plane of the textile fabric from which the gauze according to the invention was manufactured.

In an embodiment specified particularly with a view to subsequent use as a core material for the manufacture of sandwich structures, the gauze according to the invention has a large number of elevations uniformly arranged on a base. In another embodiment, the gauze according to the invention has a large number of elevations and depressions uniformly arranged in the plane of the original base. The elevations and depressions can be in the shape of steps with a round or angular base or e.g. in the shape of webs. For good adhesion between the gauze according to the invention to be used as the core material for sandwich moldings, and the facings, it is particularly advantageous for the elevations to have a flat plateau at the top or for the depressions to have a flat bottom. It is also particularly preferable for all the plateau surfaces of the elevations or bottom surfaces of the depressions to lie in one plane and parallel to the base. Again for good adhesion between the core material and applied facings, it is advantageous for the number, size, shape and spatial arrangement of the deformations per unit area of the textile fabric to be chosen such that the mathematical product of the areas of the original plane and the size of the plateau surfaces of the elevations or bottom surfaces of the depressions is as large as possible.

FIG. 1 is a schematic illustration of a section of a gauze (3) according to the invention, which has a large number of hat-shaped elevations (5) on a base (4).

FIG. 2 is a schematic illustration, on a larger scale, of one of the hat-shaped deformations and clearly shows the drastic widening of the mesh structure of the textile material which occurs in the region of the deformation.

For other fields of application, for example for the manufacture of self-supporting screens or for decorative purposes, the gauze according to the invention can of course also have other three-dimensional deformations. Furthermore, it is perfectly possible for none of the surface of the original textile material to remain unchanged in the three-dimensionally deformed gauze according to the invention, for example if the material is deep drawn by dies from both sides of the textile surface so that step-shaped or hat-shaped deformations are created alternately upwards and downwards in the material, or if the original textile surface is drawn out from both sides by a large number of narrow dies extending in the same longitudinal direction, to form a zigzag surface, and stabilized in this shape. Such a zigzag-shaped textile material is illustrated in FIG. 3. For the sake of clarity, the network structure has only been drawn in on one of the zigzag surfaces in this Figure. Also, it is not necessary at all for the network structure to have the uniform square arrangement shown in FIG. 3, the shape of the individual network openings depending more on the structure of the original textile material and deviating substantially from the indicated square structure of the network openings when a knitted fabric is used as the starting material.

To manufacture the three-dimensionally deformed, electrically conductive gauze according to the invention, the flat-shaped textile material capable of being deep drawn, preferably the knitted fabric, is first impregnated with one of the abovementioned resins suitable for mechanical stabilization of the deformations. The resins can be applied to the textile material in conventional manner by doctoring, brushing, knife coating, slop padding or, particularly advantageously, dipping. The resin-treated woven fabric is then conveniently pinched off to the desired resin uptake through a pair of pinch rolls. For the impregnation process, thermoplastic resins are conveniently applied in the form of solutions or, preferably, emulsions. Heat-curable resins (thermosetting resins) are conveniently applied in the commercially available form as highly concentrated aqueous solutions or dispersions.

After intermediate drying, if necessary, the resin-impregnated textile material is subjected to the deep-drawing process at elevated temperature. The temperature of the deep-drawing process is chosen so that thermoplastic resins can be melted and thereby completely penetrate the filaments of the network structure. The same applies to thermosetting resins; in this case, the temperature of the deep-drawing device is set so that the flow temperature range of the thermosetting resin is reached. After the resin has melted, the temperature of the deep-drawing device is adjusted so that the impregnating resin can harden. When thermoplastic resins are used, the temperature has to be reduced below the melting point of the thermoplastic resins for hardening to take place; in the case of thermosetting resins, the temperature of the deep-drawing device can normally remain unchanged because thermosetting resins also harden at elevated temperature. The deep-drawing device is kept closed until the stabilizing resin has completely hardened and the structure of the fiber material which has been produced by deep drawing remains stable.

After the three-dimensionally deformed gauze has been manufactured, its surface is metallized. For this purpose, the material is prepared for the actual metallization, in a manner known per se, by activation of the material with a solution containing noble metal ions or with a noble metal colloid, followed, if appropriate, by a so-called acceleration treatment in an aqueous acid such as tetrafluoroboric, sulfuric, hydrochloric or oxalic acid. A metal coating, e.g. a copper, nickel or gold coating, is then deposited on the gauze pretreated in the abovementioned manner. The metal is deposited by treating the prepared gauze with an aqueous solution containing the relevant metal ions and a reducing agent—in practice, formaldehyde, a hypophosphite or an alkali metal tetrahydridoborate is generally used.

If desired, a further layer of the same or a different metal can then be deposited electrolytically, in a manner known per se, on the chemically deposited metal layer.

In special cases, e.g. when required by the plastic surface of the network filaments or when particularly high demands are made on the adhesiveness of the metal coating, it is convenient to prepare the gauze for activation by treatment with a swelling agent such as acetone, ethyl acetate, trichloroacetone or trichloroacetic acid, and etching with an aqueous solution conventionally containing 300 to 900 g/l of chromic acid and, if appropriate, sulfuric acid. It is particularly surprising that this swelling and etching treatment can normally be omitted from the gauze metallization process.

Preferably, the activation (seeding) of the gauze is preceded by thorough cleaning of the surface. This can be carried out e.g. by treatment with an aqueous alkaline surfactant solution, e.g. with a commercially available so-called conditioner. A cleaning treatment in a warm (40°–70° C.) water bath under the action of ultrasound has proved particularly convenient. It is particularly advisable to use deionized water for this process.

The metallization of the gauze can be carried out exclusively by means of the chemical metal deposition process described above until the metal coating has reached the desired thickness, the thickness of the metal layer naturally depending on the exposure time of the gauze in the metallizing bath. It is normally possible to deposit ca. 2–6 μm of metal film per hour.

The preferred procedure comprises chemical production of a 0.5 to 2 μm thick film of copper or nickel, followed by electrolytic metallization, e.g. with chromium, copper, nickel, lead, lead/tin, tin, gold or a platinum metal, preferably with copper, nickel, lead, tin, a lead/tin mixture or gold, until the metal coating reaches a thickness of up to 300 μm, preferably 50 to 100 μm. If desired, conventional brighteners can be added to the electroplating baths.

An especially preferred procedure in the case of combined chemical and electrolytic metallization includes the chemical deposition of a copper film, because this is very ductile and its surface is particularly easy to activate.

The present invention further relates to a flat-shaped sandwich molding consisting of two strong outer facings bonded together via a core consisting of the above-described metallized, electrically conductive gauze according to the invention. The core material used for this purpose is the above-described gauze especially preferred for the manufacture of sandwich structures, which has a large number of elevations, with flat plateau surfaces lying in one plane, on a base. The bond between the plateau surfaces of the elevations or bottom surfaces of the depressions of the core material according to the invention and the facings can be produced by conventional lamination processes using adhesives, especially cold-curable or heat-curable adhesives such as epoxy resins or thermosetting resins. Because of the large contact area between the core material and the facings, the adhesive bond is found to be exceedingly stable. Despite the filigree structure of the core material according to the invention, the sandwich moldings manufactured therewith have a surprisingly high compressive strength for an extremely low weight. On account of the electrical conductivity of the core material, significant potential differences cannot form along the surface of the sandwich material. Such a sandwich material also exhibits good attenuation or reflection properties with respect to electromagnetic waves. If the core materials are properly joined at the edges of panels, it is thus possible to use the specifically extra-light, mechanically stable sandwich panels to build rooms and housings which are well screened from electromagnetic perturbing effects.

Inherent in the above-described process for the manufacture of the electrically conductive gauze according to the invention, there is the difficulty that a flat-shaped textile material which is capable of being deep drawn, i.e. which is relatively highly extensible, has to be impregnated with one of the abovementioned resins. On taking up resin, the woven fabrics become even heavier and—where relatively large surfaces are involved—this operation can easily lead to local pre-extension of the textile materials. This kind of partial distortion results in partial differences in the fiber strength of the material. Also, when the as yet unprecondensed but already resin-impregnated textile material capable of being deep drawn is handled, partial pre-extension of the material can easily occur, with the abovementioned disadvantages in terms of the uniformity of the quality of the end product, if special precautionary measures are not taken. This somewhat problematical step of the above-described manufacturing process can be overcome if the textile material capable of being deep drawn is processed together with a commercially available resin film instead of the woven fabric being impregnated with resin in conventional manner. In this method, one or more layers of a textile material capable of being deep drawn and one or more resin films are stacked on top of one another, the stack is converted to the desired shape by deep drawing at a temperature at which the resin becomes free-flowing, the temperature is then adjusted so that the resin can harden, and the shaped stack is kept in the desired shape until the resin has hardened completely or sufficiently, the term "hardened sufficiently" being understood as meaning that the resin in this condition is capable of stabilizing the deformed textile fabric in the desired shape after the deep-drawing tool has been opened. The resin films used in this process can also consist of thermoplastic or thermosetting resins for which the main criterion is that they are capable of stiffening the flat-shaped textile material so that it becomes self-supporting. Here too, it is especially preferred to use thermosetting resins, i.e. resins which harden at elevated temperature, with crosslinking, to give an infusible material of high rigidity. Examples of known resins of this type which are also commercially available in the form of films are unsaturated polyester resins (alkyd resins), mixtures of unsaturated polyesters with unsaturated monomeric compounds such as styrene, epoxy resins, phenolic resins or melamine resins. As already described above, the resins available in the form of films are also being brought on to the market and applied in the uncrosslinked state, in which they are still fusible and free-flowing at elevated temperature. The films of uncrosslinked resins to be used in the embodiment, discussed here, of the process according to the invention for the manufacture of the electrically conductive gauzes have a thickness of abut 50 to 500 µm, preferably 100 to 500 µm, and a weight of about 50 to 500 g/m², preferably 100 to 500 g/m². Using these resins in the film thickness indicated results in approximately the same resin impregnation as the application, described earlier, of the liquid resin preparation by conventional impregnation.

Irrespective of the type of resin application, the resin-impregnated textile material capable of being deep drawn, or the non-impregnated textile material together with the requisite resin films, is heated in a deep-drawing mold to a temperature at which the resin becomes free-flowing, then drawn into the desired three-dimensional shape and kept in this shape, at a temperature at which the resin can harden, until the resin hardening process is complete or at least sufficiently advanced for the deep-drawn material to be dimensionally stable. When using a thermosetting resin, this condition can also be obtained when hardening is not yet complete. In this case, it may be advantageous for economic reasons to complete the hardening by after-baking the molded article outside the deep-drawing tool, e.g. by means of a heat after-treatment for ca. 10 min at 160° to 200° C. in a drying oven.

The temperature at which the uncrosslinked resin melts is normally 100° to 250° C., preferably 140° to 200° C.

The gauze metallized according to the invention can be used not only for the manufacture of sandwich materials but also as a column packing material to give a high number of theoretical plates. Furthermore, if the coating metal is chosen appropriately, the material can be used as a catalyst or catalyst support.

What is claimed is:

1. A metallized, three-dimensionally deformed, dimensionally stable gauze, comprising: a three-dimensionally deformed resin-coated textile material, which is deformed from an initially flat material that has meshes and is capable of being deep drawn, at least the three-dimensional deformations of said three-dimensionally deformed resin-coated textile material having enlarged mesh openings relative to the mesh openings in the initial flat material and a filigree-type network structure, said gauze having been metallized by means of a solution which contains metal-containing ions, said metal-containing ions having been reduced to the corresponding metal and deposited on essentially the entire exposed surface of said textile material to form a continuous metal coating, the continuous metal coating having a thickness in the range of about 2 µm to about 300 µm.

2. A gauze as claimed in claim 1, wherein said continuous metal coating has been formed in a bath by reduction of metal-containing ions in the bath to a deposited metal coating, and the deposited metal coating is substantially uniform in thickness, composition, and structure over the entire exposed surface of said textile material.

3. A gauze as claimed in claim 1, wherein said continuous metal coating consists essentially of a corrosion-resistant metal.

4. A gauze as claimed in claim 3, wherein said continuous metal coating comprises copper or nickel.

5. A gauze as claimed in claim 1, wherein said continuous metal coating has been provided by a plurality of deposition steps or consists essentially of a metal alloy.

6. A gauze as claimed in claim 5, wherein the first of said deposition steps deposits a metal layer consisting essentially of copper.

7. A gauze as claimed in claim 1, wherein said textile material comprises a woven fabric or knitted fabric having meshes, and the mesh openings of said woven fabric or knitted fabric have been enlarged by deep drawing relative to the mesh openings in the initial flat material.

8. A gauze as claimed in claim 1, wherein the textile material of said resin-coated textile material consists essentially of synthetic fibers.

9. A gauze as claimed in claim 1, wherein the resin of the resin-coated textile material is a hardened synthetic resin and comprises 25 to 65% by weight of said resin-coated textile material.

10. A gauze as claimed in claim 1, wherein the three-dimensionally deformed textile material has been deformed by deep drawing, said deep drawing extending at least in a direction which has a component perpendicular to the original plane of the textile fabric.

11. A gauze as claimed in claim 1, wherein said metal-containing ions have been reduced to the corresponding metal and deposited on the exposed surfaces of said textile material by chemical or electrolytic reduction or a combination of chemical and electrolytic reduction.

12. A gauze as claimed in claim 1, wherein said textile material is an initially planar, woven or knitted fabric having meshes, which meshes have been extended by deep drawing to increase the openness thereof relative to the mesh openings in the initial flat material, said deep drawing also having produced deformations of said textile material, the deformations being in a direction having a component perpendicular to the plane of said initially planar, woven or knitted fabric.

13. A gauze as claimed in claim 11, wherein the resin of said resin-coated textile material consists essentially of a hardened synthetic condensation resin and comprises 25 to 65% by weight of said resin-coated textile material.

\* \* \* \* \*